Patented Oct. 9, 1945

2,386,744

UNITED STATES PATENT OFFICE 2,386,744

PLASTIC MASSES

Frederick J. Myers, Philadelphia, Pa., assignor to The Resinous Products & Chemical Company, Philadelphia, Pa., a corporation of Delaware No Drawing. Application July 16, 1942, Serial No. 451,211

15 Claims. (Cl. 260—6)

This invention deals with plastic masses which are substantially insoluble in hydrocarbon solvents, which are non-reactive and heat non-convertible, and which are particularly useful for coating fibrous and non-fibrous material and for modifying natural or synthetic rubber.

In application Serial No. 287,698, filed August 1, 1939, now U. S. Patent No. 2,293,164, issued Aug. 18, 1942, there are described and claimed plastic masses which are prepared by simultaneously mechanically working and heating together a urea-formaldehyde-alcohol condensate and an oil-modified alkyd resin to form a heat-nonconvertible, non-reactive, highly condensed and polymerised mass of limited thermoplasticity. It is now found that similar masses of even greater utility may be prepared by mechanically working and simultaneously heating together an organic carbamide or triazine-formaldehyde-alcohol condensate and a soluble form of a condensate of a polyhydric alcohol and an aliphatic dibasic acid of at least six carbon atoms, which is not oil-modified.

The new compositions of matter are useful for coating of fibrous materials where surface coating, particularly with but little penetration, is desired, for the coating of metal films and foils, for use as adhesives, particularly as adhesives of the so-called pressure sensitive type or gum base type as used, for example, on tapes, for use as rubber substitutes, for use as modifying agents for both natural and synthetic rubber, etc.

As a carbamide-formaldehyde-alcohol condensate, there may be used the products resulting by reacting urea or urea and thiourea, an alkyl urea, phenyl urea, dicyandiamide, guanidine, etc., and formaldehyde to form a methylol compound which is then reacted with an alcohol. These reactions may be carried out as distinct steps or may be performed in a single reaction system. Typical procedures for preparing condensates of this type are described in U. S. Patents 1,633,337, 2,019,865, and 2,171,882. As an alcohol, there may be used any alcohol which is not readily dehydrated itself when heated in an acid medium at reaction temperatures for forming the desired condensates. Alcohols of not over twelve carbon atoms, particularly aliphatic monohydric alcohols, are preferred. If desired, several alcohols may be used or a lower alcohol group may be replaced by alcoholysis with a higher alcohol. The condensates prepared are soluble in organic solvents, including an excess of the alcohol in which they are formed. If desired, however, the greater part of the reacting alcohol may be stripped off or replaced with a hydrocarbon solvent such as toluene. The most useful form and the usual form of the carbamide-formaldehyde-alcohol condensates in commerce is as a concentrated solution of the condensate in an excess of the reacted alcohol or in a mixture of such alcohol and a hydrocarbon solvent. These solvents are usually volatilized during the working and reaction of the two types of condensates.

Instead of a carbamide or in conjunction with a carbamide such as urea, there may be used a triazine, such as melamine, ammeline, thioammeline, or an ether thereof, including benzyl thio-ammeline, $\beta,\beta'$-bisthioammeline diethyl ether, etc.

As suitable condensates of a dibasic aliphatic acid and a polyhydric alcohol, there may be used the reaction products obtained by heating an acid such as adipic, pimelic, suberic, azelaic, sebacic, or higher straight chain acid with an alcohol such as ethylene glycol, diethylene glycol, triethylene glycol, propylene glycol, glycerine, pentaerythritol, etc. The dihydric aliphatic alcohols are a preferred but not exclusive class as, broadly, any polyhydric alcohol is capable of giving condensates with dibasic acids. In addition to the above aliphatic acid of at least six carbon atoms, there may be used in an equal or lesser proportion another polybasic acid such as phthalic, maleic, succinic, oxalic, rosin-maleic adduct, citric, tartaric, etc., or mixtures thereof. There may similarly be used mixtures of various polyfunctional alcohols, including glycols, glycerine, polyglycerol, pentaerythrite, sorbitol, mannitol, and the like. Modification of the original dibasic acid-polyhydric alcohol condensate thus becomes possible, but with retention of the fundamental properties of the primary type of condensate, which appear due primarily to the dibasic aliphatic acid.

Changes in properties of the reaction products of this invention may also be made by introduction of minor amounts of modifying agents, that is, materials incorporated with the reaction products of carbamide-formaldehyde-alcohol condensate and dibasic acid-polyhydric alcohol condensate to control some one of the superficial properties without altering the fundamental properties. The modifying agents include hard resins, plasticizers, waxes, metallic soaps, pigments, etc. Thus, hard resins, such as phenol-formaldehyde condensates or maleic-anhydride-rosin adducts, may be added to improve gloss or hardness. Waxes may be added to overcome excessive tack when this property is not desired and to increase "slip." Suitable waxes are candelilla, carnauba, paraffin, montan, etc. Metallic soaps such as calcium or zinc stearate may be used to provide slip or to increase water-resistance. Additional film-forming or toughening agents may likewise be used as modifiers, including ethyl cellulose, nitrocellulose, vinyl resins, acrylic resins, and synthetic or natural rubbers.

The proportions of materials may be varied considerably. From two to thirty parts of the carbamide or triazine-formaldehyde-alcohol condensate may be used for 100 parts of the dibasic acid-polyhydric alcohol condensate with excellent results. The optimum proportions will depend upon the intended use and the particular materials chosen. Modifying agents should, in general, constitute less than half of the final product.

In reacting the carbamide- or triazine-formaldehyde-alcohol condensate and the dibasic acid-polyhydric alcohol condensate with or without modifying agents, the two condensates are mixed and then worked mechanically while the mixture is heated. Heating at 45° C. to 180° C. is suitable and is carried on until the mass becomes homogeneous, essentially infusible, heat-nonconvertible, highly condensed and polymerized. The period of mechanically working and simultaneously heating may vary from fifteen minutes to about five hours. The reaction between the two condensates may be performed in any suitable container equipped with a powerful stirrer. A mixer of the Werner-Pfleiderer type is preferred.

The reaction product varies from a coarse, granular powder to a tough, rubbery mass which may be sticky, depending upon choice and proportion of reactants and modifying agents and the conditions of reaction. The products may be worked on a rubber mill as a usual thing and formed into films or sheets.

The reacted products may be compounded with fillers such as wood flour, carbon black, cork, asbestos, etc. They may also be worked with dispersing agents and/or protective colloids. The resulting mixes may then be dispersed in water or organic solvents.

As dispersing agents, there may be used fatty acid soaps, particularly amine soaps such as triethanolamine oleate or ricinoleate, sulfated alcohols, sulfonated ethers, sulfonated amide derivatives, etc. Protective colloids are also desirably used, such as casein, gelatin, gum arabic, gum tragacanth, water-soluble cellulose ethers, including methyl cellulose and hydroxyethyl cellulose, or alginates. In some cases, as in that of casein, the protective colloid serves both as dispersing agent and as protective agent.

After such agent or agents have been incorporated into the plastic resinous mass, water may be worked in to form dispersions of excellent stability. If desired, the dispersions may be further worked in a colloid mill. Another modification in the preparation of the dispersions may be made by softening the reaction products with an organic solvent such as toluene, dibutyl phthalate, mineral thinner, etc., prior to incorporation of the dispersing agent and water. These solvents swell but do not dissolve the reaction products.

The dispersions may be applied by dipping, spraying, roller coating, padding, etc. Special apparatus, solvent recovery systems, and curing equipment are not required. Dispersions deposited on any given surface form a thin adherent film after dehydration. This film is more or less continuous and differs in some respects from films obtained from varnish or lacquer. It may be rendered more nearly impervious by repeated application or by mechanical treatment, such as calendering particularly with heat. Calendering may also be used to increase gloss, water-resistance, grease-resistance and permeability to vapors. The reaction products may also be used by milling or calendering without being dispersed as just described.

The plastic materials of this invention may be pigmented when so desired. The aqueous dispersions of the plastic materials may also be mixed with pigments and may be used in conjunction with such materials as starch, particularly to increase resistance to grease.

In the following examples, further details of the preparation of the new plastic materials are presented.

*Example 1*

One hundred parts of sebacic acid, 18 parts of glycerin, and 35 parts of diethylene glycol were heated together until an acid number below 20 was reached. A urea-formaldehyde-alcohol condensate was then prepared by mixing 100 parts of urea, 130 parts of 40% formaldehyde solution, and 170 parts of n-butanol and heating the mixture under reflux with removal of water. When water was no longer freely evolved, one part of oxalic acid was added and heating continued. Xylene was added in small amount to aid in sweeping out water. The solution was finally adjusted to a 50% solids content. 140 parts of this solution and 1,000 parts of the dibasic acid-polyhydric alcohol condensate were mixed and mechanically worked while the mixture was heated to 130° C. for one and one-half hours. The resulting plastic mass was light yellow in color, insoluble in hydrocarbons, and somewhat tacky. It could be sheeted or calendered onto Cellophane or paper to yield adhesive tapes, which were capable of release from glass, wood, or metals. The product had considerable elasticity, but was not as tough as crepe rubber.

*Example 2*

An alkyd type resin was prepared by reacting 100 parts of the acids recovered from the by-product acids from the manufacture of sebacic acid as described in application Serial No. 336,059, filed May 18, 1940, now Patent No. 2,317,668, 100 parts of phthalic anhydride, 25 parts of glycerin, and 60 parts of glycol. A condensate was also prepared from 110 parts of urea, 10 parts of thiourea, 60 parts of paraformaldehyde, 140 parts of butanol, and 20 parts of xylene, which were treated to form a primary condensate, and then acidified and heated under reflux with separation of water to form a carbamide-formaldehyde-alcohol condensate. A portion of 100 parts of the alkyd condensate was placed in a Werner-Pfleiderer mixer and heated to 90° C. Thereupon, 10 parts of the carbamide-formaldehyde-alcohol condensate was added and mixed with the alkyd. The temperature was then raised to 140°–150° C. until the mass became insoluble in naphtha. The product was brown in color, somewhat tacky, elastic, and rather tough. This reaction was modified by milling with 25 parts by weight of dibutyl phthalate and calendered onto cloth to give a product resembling rubberized fabric or certain artificial leathers.

*Example 3*

The condensates of Example 2 were mixed in the proportion of 100 parts of the alkyd condensate to 15 parts of the carbamide-formaldehyde-alcohol condensate and heated at 135° C. for about two hours. The product was dark brown in color, soft, resilient, tough, and slightly tacky. This product was found particularly useful for the extension and modification of Perbunan type synthetic rubber, yielding a tread stock which, when formulated and cured, gave a rubber stock with a tensile strength in excess of 2500 pounds per square inch. Perbunan type synthetic rubber is prepared by the copolymerization of butadiene and acrylonitrile.

*Example 4*

The condensates used in Example 2 were mixed in the proportion of 100 parts of the alkyd condensate to 20 parts of the carbamide-formaldehyde-alcohol condensate and heated at 140° C. The resulting product was a hard, dry, rubbery mass, which could be compressed and sheeted.

*Example 5*

A mixture was made from 1,000 parts of the alkyd condensate of Example 1 and 120 parts of a melamine-formaldehyde-alcohol condensate prepared from 90 parts of melamine, 290 parts of 37% aqueous formaldehyde, 250 parts of butanol, and 10 parts of xylene, catalyzed with one part of formic acid, adjusted with xylene to a 50% solids basis. After the mixture had been mechanically worked and heated at 130°–140° C. for an hour, the product was insoluble in hydrocarbons. It was tacky and elastic, but firm. The mass before milling was somewhat crumbly, but could be worked on a rubber mill to a tough, flexible sheet.

*Example 6*

The reaction product of 125 parts of adipic acid, 50 parts of phthalic anhydride, 25 parts of glycerin, and 90 parts of diethylene glycol was prepared and 1,000 parts thereof mixed with 140 parts of a condensate prepared from urea, formaldehyde, and isopropyl alcohol from which most of the isopropyl alcohol had been replaced by alcoholysis with capryl alcohol and the solids adjusted to 50%. The mixture was heated and worked in a kneader at 145° C. until the product was insoluble in naphtha. 600 parts of the product was placed on a rubber mill and worked with a paste of 30 parts of casein, 15 parts of triethanolamine oleate, 15 parts of ammonium hydroxide, and 270 parts of water. Additional water was worked in and the paste then taken up with 500 parts of water containing 10 parts of ammonium hydroxide solution. The resulting dispersion was useful for coating fabrics, paper, leather, etc., with a non-penetrative, adhesive coat.

I claim:

1. A process for preparing an infusible, heat non-convertible, homogeneous, plastic mass, which comprises mechanically working together between about 45° C. and about 180° C. until the resulting product is essentially insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble condensate of a member of the class consisting of carbamides and aminotriazines, formaldehyde and an aliphatic alcohol of not over twelve carbon atoms.

2. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble condensate dissolved in an excess of its alcohol and made from a member of the class consisting of carbamides and aminotriazines, formaldehyde and an aliphatic alcohol of not over twelve carbon atoms.

3. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of sebacic acid and a polyhydric alcohol and from about two to about thirty parts of a hydrocarbon-soluble condensate dissolved in an excess of its alcohol and made from a member of the class consisting of carbamides and aminotriazines, formaldehyde and an aliphatic alcohol of not over twelve carbon atoms.

4. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble condensate dissolved in an excess of its alcohol and made from a carbamide, formaldehyde and a monohydric, aliphatic alcohol of not over twelve carbon atoms.

5. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a dihydric, aliphatic alcohol and from about two to about thirty parts of a hydrocarbon-soluble condensate dissolved in an excess of its alcohol and made from a carbamide, formaldehyde and a monohydric, aliphatic alcohol of not over twelve carbon atoms.

6. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol, from about two to about thirty parts of a hydrocarbon-soluble urea-formaldehyde-alcohol condensate in concentrated solution, and a modifying agent.

7. A process for preparing an infusible, heat non-convertible, homogeneous, plastic mass, which comprises mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol, from about two to about thirty parts of a hydrocarbon-soluble melamine-formaldehyde-alcohol condensate in concentrated solution, and a modifying agent.

8. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble condensate of a member of the class consisting of carbamides and aminotriazines, formaldehyde and an aliphatic alcohol of not over twelve carbon atoms.

9. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble carbamide-formaldehyde-alcohol condensate.

10. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble aminotriazine-formaldehyde-alcohol condensate.

11. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of sebacic acid and a polyhydric alcohol and from about two to about thirty parts of a hydrocarbon-soluble urea-formaldehyde-alcohol condensate in which the alcohol residue is from an aliphatic alcohol of not over twelve carbon atoms.

12. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of sebacic acid and a polyhydric alcohol and from about two to about thirty parts of a hydrocarbon-soluble melamine-formaldehyde-alcohol condensate in which the alcohol residue is from an aliphatic alcohol of not over twelve carbon atoms.

13. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol, from about two to about thirty parts of a hydrocarbon-soluble carbamide-formaldehyde-alcohol condensate, and a modifying agent.

14. An insoluble, heat non-convertible, highly condensed and polymerized, homogeneous, plastic mass of limited thermoplasticity which comprises the reaction product obtained by mechanically working together between about 45° C. and about 180° C. until the resulting product is insoluble in hydrocarbon solvents about 100 parts of an organic, solvent-soluble, non-oil-modified condensate of a saturated, aliphatic, dicarboxylic acid having an uninterrupted chain including the carbon atoms of the carboxyl groups of at least six carbon atoms and a polyhydric alcohol and from about two to about thirty parts of a hydrocarbon-soluble carbamide-formaldehyde-alcohol condensate, said mass being dispersed in water with a protective colloid.

15. The dispersion of claim 14 in which the protective colloid is casein.

FREDERICK J. MYERS.